United States Patent
Loosveld et al.

(10) Patent No.: US 9,320,257 B2
(45) Date of Patent: Apr. 26, 2016

(54) GATE SYSTEM TO GRANT AN ANIMAL ACCESS TO A SPACE

(75) Inventors: Serge Louis Loosveld, Borne (NL); Wilhelmus Johannes Adrianus Van Lier, Roosendaal (NL)

(73) Assignee: LELY PATENT N.V., Maassluis (NL)

( * ) Notice: Subject to any disclaimer, the term of this patent is extended or adjusted under 35 U.S.C. 154(b) by 0 days.

(21) Appl. No.: 13/089,445

(22) Filed: Apr. 19, 2011

(65) Prior Publication Data

US 2011/0192356 A1 Aug. 11, 2011

Related U.S. Application Data

(63) Continuation of application No. PCT/NL2009/000196, filed on Oct. 12, 2009.

(30) Foreign Application Priority Data

Oct. 24, 2008 (NL) ...................................... 1036114

(51) Int. Cl.
*A01K 29/00* (2006.01)
*A01K 1/00* (2006.01)

(52) U.S. Cl.
CPC ..................................... *A01K 1/0023* (2013.01)

(58) Field of Classification Search
USPC .................. 119/840, 843, 510, 524, 14.03
See application file for complete search history.

(56) References Cited

U.S. PATENT DOCUMENTS 5,595,144 A 1/1997 Löher
6,213,052 B1 * 4/2001 Oosterling ................. 119/14.08

FOREIGN PATENT DOCUMENTS

JP 05023075 A * 2/1993 ............. A01K 29/00
JP 2007267698 A * 10/2007
WO 00/18221 A1 4/2000

OTHER PUBLICATIONS

International Search Report for PCT/NL2009/000196 (issued Jan. 14, 2010).
NL Search Report for NL 1036114 (issued May 20, 2009).

* cited by examiner

*Primary Examiner* — Shadi Baniani
(74) *Attorney, Agent, or Firm* — Hoyng Rokh Monegier LLP; Ramin Amirsehhi; David P. Owen (57) ABSTRACT

The invention includes an assembly to provide an animal access to a space. The assembly includes an entrance gate which, in a first position provides access to the space and, in a second position, blocks the access to the space. The assembly further includes a measuring device configured to measure a walking speed of the animal, and to transmit a signal indicative of the measured walking speed. The assembly also includes a control device configured to receive the signal from the measuring device, and to control the entrance gate depending on the received signal.

By using the measured walking speed of the animal, the control device can, for example, close the entrance gate sooner or close it more quickly if there is a threat of an animal being crushed.

15 Claims, 5 Drawing Sheets

GATE SYSTEM TO GRANT AN ANIMAL ACCESS TO A SPACE

CROSS REFERENCE TO RELATED APPLICATIONS

This application is a continuation of PCT application number PCT/NL2009/000196 filed on Oct. 12, 2009, which claims priority from Netherlands application number NL1036114 filed on 24 Oct. 2008. Both applications are hereby incorporated by reference in their entireties.

BACKGROUND OF THE INVENTION

1. Field of the Invention

The invention relates to an assembly of a gate system limited by lateral boundaries to provide an animal access to a space.

The invention also relates to a control device for the assembly, a method of providing an animal access to space, and a computer program product stored on a computer-readable medium.

2. Description of the Related Art

Gate control systems are used to sort, move or distribute livestock in groups in a controlled manner. In systems of this type, the animals wanting to move through the gate system from one space to another space are identified and, depending on the identification and on data linked to the identification, the animal is allowed through the gate system or, for example, is led to a specific selected space.

A gate control system of this type is known, for example, from U.S. Pat. No. 5,595,144. In this patent document, a device is described for sorting animals. The device comprises a first electronic sensor for scanning the animals and at least one downstream sorting gate movable back and forth in accordance with indicators. The indicators identify the animals detected by the first sensor. The device provides alternating access to one of at least two exits connected to the gate control system. The device also comprises an entrance gate disposed upstream of the sorting gate, wherein the entrance opens or closes in response to animal-identification indicators detected by a second sensor. The distance between the second sensor and the first sensor is between 2 and 8 meters and is selected in such a way that the entrance gate closes at the proper time. The entrance gate preferably remains open and is only closed if an animal with a different indicator is detected. Following the closing of the entrance gate, the detained animal is scanned by the first sensor near the entrance gate and the sorting gate is set to the desired position, after which the entrance gate is again opened.

A disadvantage of the gate control system as described above is that the opening and closing of the entrance gate is not performed reliably and, as a result, an animal is led in an unwanted manner through the gate to the wrong exit of the at least two exits, or an animal is crushed between the entrance gate and/or the sorting gate.

BRIEF SUMMARY OF THE INVENTION

The object of the invention is to provide an assembly with an entrance gate to provide an animal access to a space, wherein the reliability of the access provision is improved.

The object is achieved with an assembly for providing an animal access to space as comprising: an entrance gate which, in a first position, provides access to the space and, in a second position, blocks the access to the space, a measuring device configured to measure a walking speed of the animal and to transmit a signal indicative of the measured walking speed, and a control device configured to receive the signal from the measuring device, and to control the entrance gate depending on the received signal.

In the assembly according to the invention, the walking speed of the animal is measured and then used to switch the entrance gate into the desired position. An entrance gate comprises a movable part and usually comprises a lateral boundary to channel the animals through the movable part. By using the measured walking speed, the control device of the assembly can anticipate when the animal will be at the entrance gate and the control device can control the entrance gate in such a way that the entrance gate is in the desired position as soon as the animal is at the entrance gate. If the entrance gate is, for example, already in the desired position for the animal concerned, the control device can leave the entrance gate undisturbed. However, if the animal moves quickly and if the entrance gate needs to be set to a position other than the present position for the animal concerned, the control device can control the entrance gate depending on the received speed information. The control of the control device could, for example, be such that, if the animal walks relatively quickly, the entrance gate changes sooner from the first position to a second position, or vice versa, to ensure that the entrance gate is in the desired position as soon as the animal is present at the entrance gate. The control of the control device could also consist in adjusting the speed with which the entrance gate changes from the first position to the second position or vice versa according to the measured walking speed of the animal. In this way, it can be ensured that the reliability of the assembly is improved.

The known system from U.S. Pat. No. 5,595,144, which is hereby incorporated by reference, has a sorting gate, an entrance gate, a first sensor and a second sensor. The second sensor is positioned at a distance between 2 and 8 meters from the entrance gate. If an animal that must be led to another of the at least two exits is identified at the second sensor, the entrance gate is closed in order to be able to move the separating gate. The closing of the entrance and/or the movement of the separating gate takes place at a predetermined speed. If an animal moves quickly in the direction of the entrance gate and/or the separating gate, the animal could slip through the entrance and/or the separating gate and therefore go through an exit other than the desired exit. The animal could also go through the entrance gate and/or the separating gate while the gate or gates change(s) position, whereby the animal may get stuck between the entrance gate and/or the separating gate. This could result in great stress and/or injury to the animal which is naturally undesirable, and could result in a sick animal. In the assembly according to the invention, the entrance gate is controlled depending on the measured walking speed of the animal. An animal can thus be prevented from slipping through and/or being crushed and/or injured.

An additional advantage of the invention is that, by using the measured speed information of the animal, the closing of the gate system can be adjusted according to the instantaneous situation so that the well-being of the animals remains as high as possible. In general, when automatic gate systems are used for animals, the gate systems should preferably move as slowly as possible. As a result, the animals are not frightened by suddenly fast-moving gates, whereby the animals are less nervous and the general well-being of the herd is maintained. Since the assembly according to the invention makes the control of the entrance gates dependent on the measured walking speed of the animals, the speed of the opening and/or closing of the entrance gate can be adjusted so that the reliability of the entrance gate remains very high while the well-being of the animals is barely disturbed. Only in a case where one of the animals from the herd threatens to slip through the entrance gate in an unwanted manner could the entrance gate be closed more quickly. In such a case, the well-being of the animals is in fact disturbed, but this is necessary to maintain the high reliability of the assembly.

The reliability of the assembly that comprises an entrance gate to provide animals access to a space can be very important. For example, if the animals consist of dairy cattle and if the space is, for example, an automated milking parlour, it is important for the farmer concerned that, for example, sick animals do not gain access to the milking parlour. If a sick animal nevertheless gains access to the milking parlour, the milk from this sick animal could contaminate the stored milk, as a result of which this stored milk will no longer be fit for consumption. This could be financially disadvantageous for the farmer and, if this goes unnoticed, could even make consumers sick.

The assembly could also be used to separate and/or sort a livestock herd. In such a case, the entrance gate could comprise a first position to provide access to a first space, and could comprise a second position to provide access to a second space. The reliability of a separating and/or sorting system of this type would also be improved by using the assembly according to the invention, wherein the entrance gate is controlled depending on the walking speed of the measured animals.

Finally, the assembly according to the invention could result in cost reduction compared with the known system. The known system comprises both an entrance and a separating gate. Both are necessary because the entrance gate detains the animals for as long as the separating gate is set to the desired position, whereafter the entrance gate opens to allow the animals through. In the assembly according to the invention, the entrance gate is controlled depending on the walking speed of the animal. By using the speed information of the animal, the entrance gate is no longer necessary, as a result of which the assembly according to the invention can be produced more economically than the known gate control system.

In one embodiment of the assembly, the measuring device is configured to receive a measurement signal from the animal, wherein a variation of the measurement signal is used to determine the walking speed of the animal. The received measuring signal could, for example, be a reflected signal such as a speed measurement carried out using a radar system. The radar system transmits a radio pulse and measures the reflected radio pulse. The walking speed of the animal can be determined from the Doppler shift of the reflected radio pulse with the aid of known algorithms. The reflected signal could also be a reflected light signal. The measuring device could, for example, comprise a laser which emits a short light pulse. The emitted light pulse may lie within the visible part of the light spectrum or, for example, in the infrared part of the light spectrum. A sensor measures how long it takes before a part of the light pulse is reflected by the animal and can thus determine the distance between the measuring device and the animal. By repeating this measurement after a specific time, the walking speed of the animal can be determined from the change in distance and the elapsed time. The reflected signal could also be a radio signal which, for example, is transmitted by an RFID tag following the reception of a trigger signal transmitted by the measuring device. RFID tags are identification systems which respond to a radio signal at a specific frequency. A passive RFID tag absorbs a part of the energy of a received radio signal and responds to the received radio signal by transmitting its own radio signal in which, for example, identification information relating to the animal is encrypted. The RFID tag thus actually reflects the radio signal transmitted by the measuring device and changes the reflected signal in such a way that it comprises additional information specific to the RFID tag concerned. The signal strength of the reflected radio signal of a relevant RFID tag changes with the distance between the measuring device and the RFID tag. By then activating the relevant RFID tag in relatively short succession, the change in distance can be determined from the change in the signal strength of the reflected radio signal from the RFID tag, and subsequently the walking speed of the animal. Given that livestock in a herd are often equipped with an RFID tag in order to be able to identify the animals, the existing identification system could be used by the measuring device of the assembly according to the invention. Through an adapted method of reading out the existing RFID tag and through an adapted interpretation of the received/"reflected" radio signal from the RFID tags, speed information can be obtained from an existing identification system for use in the assembly according to the invention. This could deliver cost benefits to the user. The adaptation of the method of reading out and interpreting the received signal could be incorporated into the existing identification system by adding an additional control device, or by adapting the control software of the identification system so that it is possible to carry out the adapted method of reading out and interpreting using the existing identification system.

In another embodiment of the assembly, the assembly is configured to receive two consecutive measurement signals from the animal, said two consecutive measurement signals being separated by a time window, wherein the assembly is configured to measure the time window. If the change in the measurement signal is known with the distance to the measuring device, the walking speed can be determined with relative ease. The direction in which the animal is moving can also be determined in this way. For the assembly according to the invention, the speed component of the animal in the direction of the entrance gate is important. This speed component determines how long the animal will take to reach the entrance gate and provides the control device with the information to adjust the control of the entrance gate according to the measured speed component.

If the measurement signal is a reflected radio signal, the assembly according to the invention is configured to transmit two radio pulses in succession, whereafter the two consecutive measurement signals are measured and the time window between the two measurement signals is measured. If the measurement signal is a reflected optical signal, the assembly according to the invention is configured to transmit two optical pulses in succession.

In another embodiment of the assembly, the measuring device comprises an identification sensor. The identification sensor could, for example, be an active or passive identification sensor. The active identification sensor is configured to receive a trigger, for example, by measuring a signal transmitted by the measuring device. A signal is then transmitted from the active identification sensor with data relating to the animal, for example, a radio signal or an optical signal. Given that active identification sensors incorporate their own energy source, usually in the form of a battery, the signal with the identification information is transmitted only if the trigger signal is received. A passive identification sensor has already been described above. This absorbs a part of a radio signal transmitted by the measuring device and "reflects" a part of the radio signal, wherein the reflected signal also comprises the identification information.

In another embodiment of the assembly, the measuring device is configured for the more or less continuous measurement of the walking speed of the animal. The more or less continuous measurement of the walking speed of the animal takes place, for example, if the animal is located at a predefined distance from the entrance gate and moves towards the entrance gate. The more or less continuous measurement of the walking speed comprises both the continuous measurement of the walking speed and the measurement of the walking speed by receiving a stream of measurement signals separated by a predefined time window, whereby a stream of speed information is received by the measuring device at times discretely separated from one another. The time duration between two measurement signals, and therefore the length of the predefined time window, could be within a range from 5 seconds to a few milliseconds. An advantage of the more or less continuous measurement of the walking speed of the animal is that sudden speed changes can be detected by the measuring device and the control device can adjust the control of the entrance gate depending on the received speed change. Especially if the assembly is used, for example, for livestock, the reliability of the assembly for providing access to a space can thus be improved. In any event, the speed at which an animal moves is relatively unpredictable. Especially if a gate system is used in which the entrance gate is movable, the animal's experience with the gate system can be unpleasant, whereby the animal, on approaching the entrance gate, could suddenly and unpredictably change speed. An animal may, for example, be nervous, and as a result may approach the gate system more cautiously so that the walking speed of the animal decreases substantially. By means of the more or less continuous measurement, the control device can anticipate the measured change in the walking speed of the animal and the control device can adjust the control of the entrance gate according to the changed walking speed.

The more or less continuous measurement of the walking speed could, for example, be carried out with each of the sensors as in the measuring method described earlier. In an alternative embodiment, the walking speed could be measured, for example, with the aid of a sensor on the animal itself. An example of a sensor of this type could, for example, be a Global Positioning System sensor which continuously records the location of the animal, from which a value for the walking speed could be derived with relative ease. Sensors of this type can, for example, be integrated into the identification sensor.

In an embodiment of the assembly according to claim 6, the measuring device comprises an optical sensor, a mechanical sensor and/or an RF sensor. An optical sensor comprises, for example, an infrared sensor, a laser sensor and/or a camera. A mechanical sensor comprises, for example, a switch on the ground which, for example, measures the successive activation by the forelegs and hind legs. A mechanical sensor could also comprise a type of turnstile. The RF sensor comprises, for example, a sensor for measuring signals originating from active RFID tags and/or passive RFID tags.

In a further embodiment of the assembly, the measuring device comprises a first sensor and a second sensor, wherein: the first sensor is configured to measure the presence of the animal at a predefined first position and is configured to transmit a first signal indicative of the presence of the animal at the first position, and the second sensor is configured to measure the presence of the animal at a predefined second position which differs from the first position, and is configured to transmit a second signal indicative of the presence of the animal at the second position, and wherein the measuring device and/or the control device is configured to receive the first signal and the second signal, and to determine the walking speed of the animal based on the received first signal and the second signal. The embodiment as described above comprises a two-point measurement, from which the walking speed of the animal can be determined. Two sensors are positioned at a predefined distance from one another, wherein the time taken by the animal to move from the first predefined position to the second predefined position is measured. From this, an average walking speed of the animal between the two measurement points can be determined with relative ease. The signal indicative of the measured walking speed, could thus also comprise the first and second signals. Systems of this type, which comprise a two-point measurement, are relatively simple to install, wherein the requirements imposed on the control device to interpret the measurement signals are relatively low. Thus, despite the fact that two sensors are required, the costs per sensor are usually relatively low and the costs for the control device which is required to control the entrance gate are also relatively low.

The known gate control system from U.S. Pat. No. 5,595,144, which is hereby incorporated by reference in its entirety, also comprises a first and a second sensor. However, the known gate control system from U.S. Pat. No. 5,595,144 does not use the two sensors to determine the walking speed of the animal. The second sensor identifies an animal and the first sensor is used only if an animal is stopped in front of the entrance gate and the sorting gate must be moved into a different position. Similarly, neither the entrance gate nor the sorting gate in the known gate control system from U.S. Pat. No. 5,595,144 is controlled depending on a signal indicative of the measured walking speed. In the assembly according to the invention, a walking speed of the animal is determined by using the first and second sensors, and the entrance gate is controlled on the basis of this measured walking speed. Preferably, in the assembly according to the invention, the sensor from the first and second sensors which is located closer to the entrance gate will be positioned at such a distance from the entrance gate that the control device can use the measured walking speed to control the entrance gate.

In yet another embodiment of the assembly, the control of the entrance gate depending on the received signal comprises the increase in a speed of movement of the entrance gate between the first position and the second position to prevent the unwanted passage of the animal, or to prevent the animal from being crushed. If the entrance gate comprises two moving parts, the animal could be crushed between the two moving parts. If the entrance gate comprises one moving part, the animal could be crushed between the entrance gate and a lateral boundary.

In yet a further embodiment of the assembly, the measuring device comprises only one sensor to measure the walking speed of the animal. An advantage of this embodiment is that the assembly is generally faster and simpler to install, given that only a single sensor needs to be fitted. The single sensor could, for example, comprise a speed sensor which is fitted in such a way that the walking speed of the animal is measured at a predetermined distance from the entrance gate. The control device or the measuring device comprises means to convert the measured signal into a value which is indicative of the walking speed of the animal. These means can be implemented as hardware in the control device or measuring device, or can be implemented as software in the control device or measuring device.

In another embodiment of the assembly, the assembly comprises a stimulator to change the walking speed of the animal. A stimulator of this type could reduce the walking speed of the animal, for example, to prevent the animal from getting stuck in the entrance gate. A stimulator could, for example, be a lamp or a sound signal. The stimulator could also be used to increase the walking speed of the animal. A stimulator of this type could, for example, apply a mild electric shock to the animal to prompt the animal to move more quickly.

In yet another embodiment of the assembly, the control device is configured to control the stimulator depending on the received signal or the received first and second signal. The stimulator could then be used before the speed of movement of an entrance gate is increased, for example, to ensure that the animal which is located relatively close to the entrance gate can still pass through the entrance gate and the following animal will be detained by the entrance gate.

In a further embodiment of the assembly, the measuring device is configured to determine the walking speed of more than one animal more or less simultaneously. If, for example, the sensor is a camera on which the walking speed of the animal can be determined via image processing, the speed of other animals located within the range of the camera could also be more or less simultaneously determined. Even if, for example, RFID tags are used and a trigger signal triggers the RFID tags to emit a response, the sensor can be configured to detect the various RF signals and to determine from these signals the walking speed and the position of the different animals in relation to the sensor. In an embodiment of this type, the control device could also use the differences in the walking speed between the different animals to control the entrance gate. If, for example, it appears from the simultaneously determined speeds of movement of two animals that the distance between the animals will become greater and that the first animal must still pass through the entrance gate, whereas the second animal must be detained, the control system can predict the distance between the animals by means of the speed measurement when they are at the entrance gate, and can control the entrance gate on the basis of the predicted distance between the animals.

In yet another embodiment of the assembly, the stimulator is used to change a difference in walking speed of two animals. As a result, the control device can actively control the speed of passage through the entrance gate. If, for example, the animals must be sorted from a larger herd by the assembly according to the invention, the speed with which this sorting takes place is normally determined by the slowest-walking animal. The control device could use the stimulator to increase the walking speed of the slowest animal, thereby increasing the overall speed of passage. At the same time, a fast-walking animal could disrupt the sorting order, and the stimulator or a different type of stimulator could be used to adjust the walking speed of this animal in line with the rest of the herd.

The invention also relates to a control device for an assembly according to one of the preceding claims.

The invention also relates to a method of controlling an entrance gate in an assembly. The method comprises the following steps:

the reception of the signal from the measuring device, and
the control of the entrance gate depending on the received signal.

In an embodiment of the method, the step of controlling the entrance gate depending on the received signal comprises the increase of a speed of movement of the entrance gate between the first position and the second position to prevent the unwanted passage of the animal, or to prevent the animal from being crushed.

In another embodiment of the method, the method also comprises the step of activating a stimulator to change the walking speed of the animal.

BRIEF DESCRIPTION OF THE DRAWINGS

The features and advantages of the invention will be appreciated upon reference to the following drawings, in which.

The figures are schematic and are not drawn to scale. Some dimensions are exaggeratedly increased for illustrative purposes. Identical elements in the drawings are, as far as possible, indicated with the same reference numerals.

DESCRIPTION OF ILLUSTRATIVE EMBODIMENTS

The following is a description of certain embodiments of the invention, given by way of example only and with reference to the drawings.

Figure 1A:
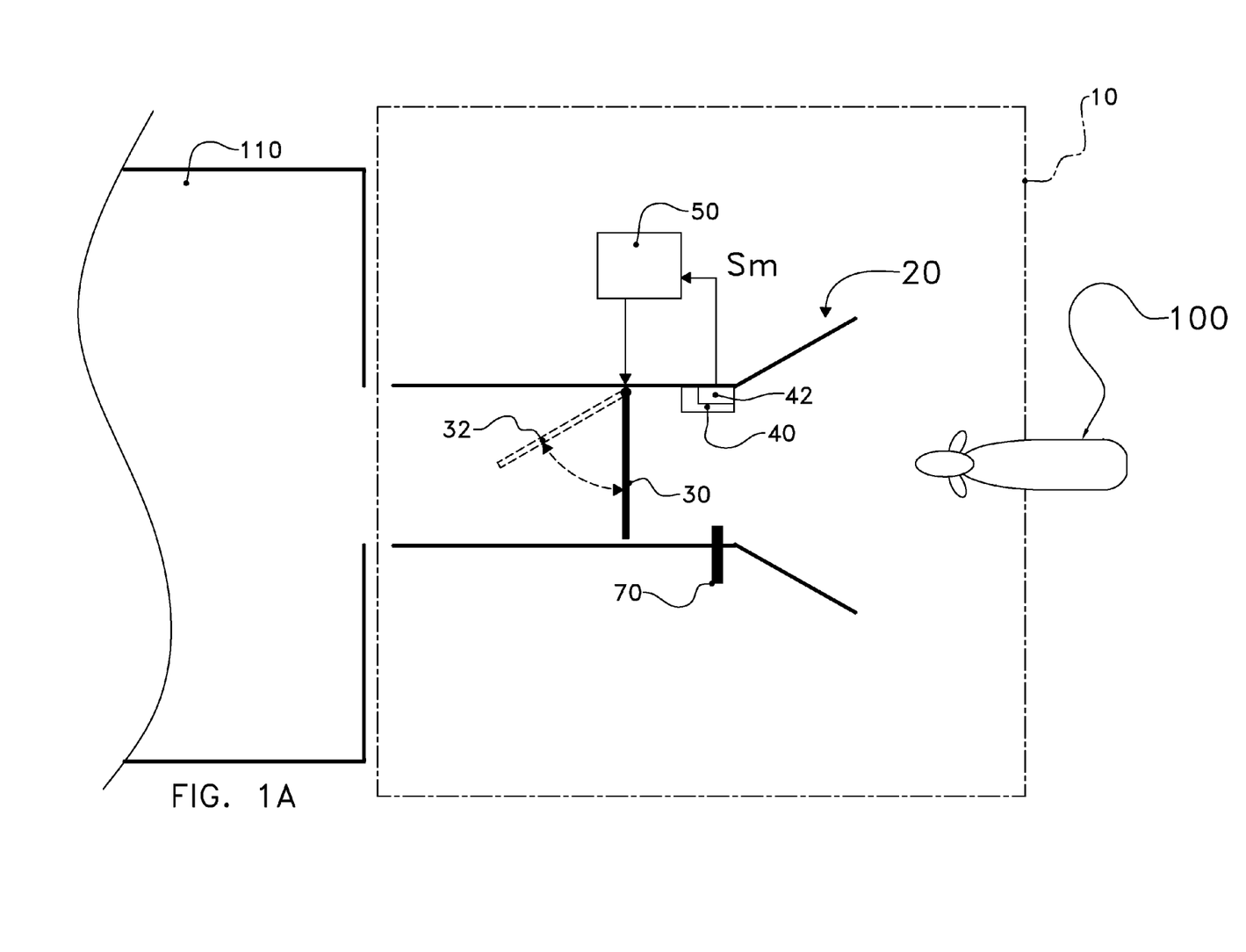
FIGS. 1A and 1B show a schematic representation of an assembly according to the invention.
Figure 1B:
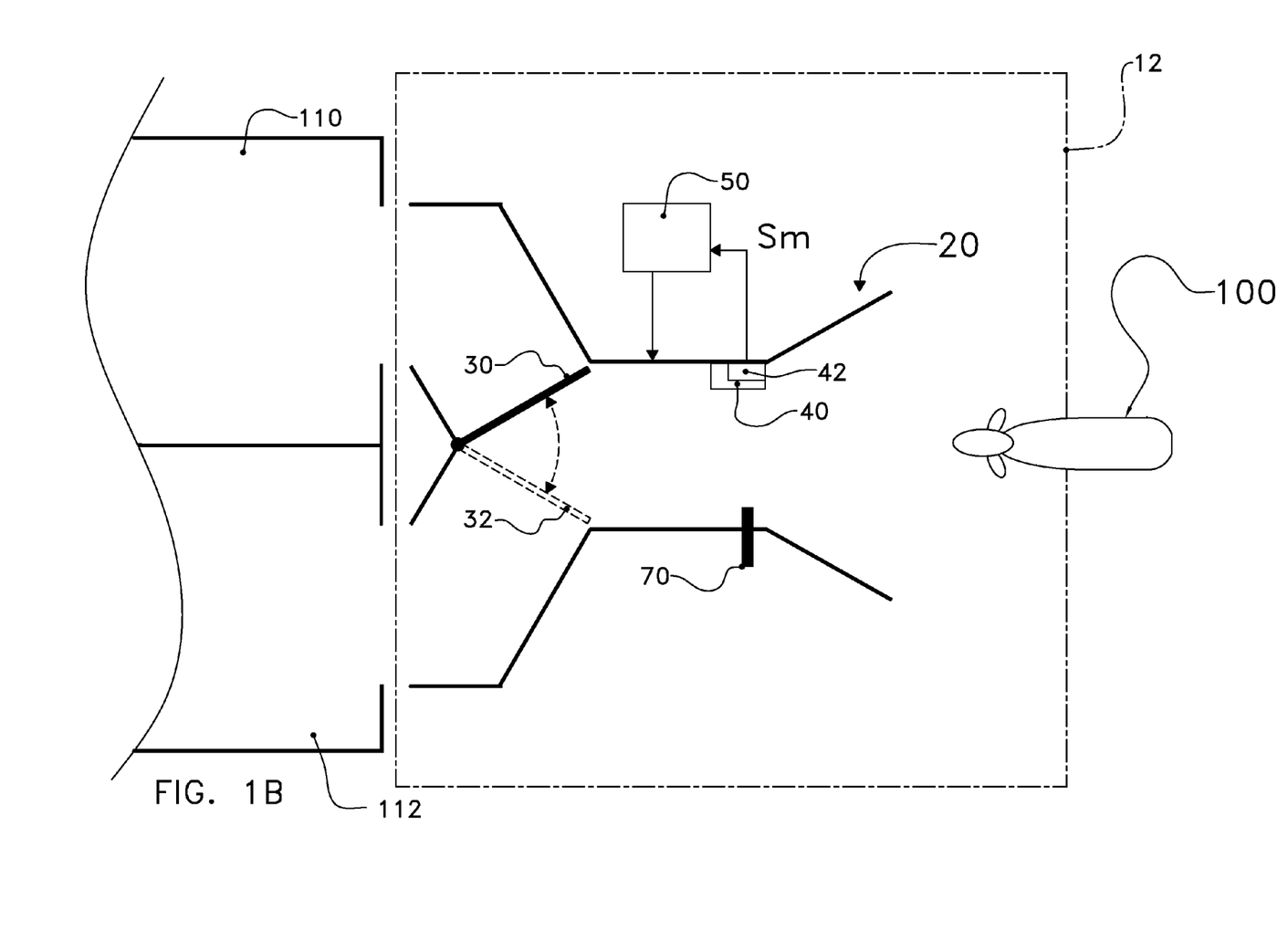

FIGS. 1A and 1B show a schematic representation of an assembly 10; 12 according to the invention. The assembly 10; 12 according to the invention comprises an entrance gate 30, 32 which, in a first position 32, provides access to the space 110 and, in a second position 30, blocks the access to the space 110. The space 110 could, for example, be a feed space 110 where the animals 100 can obtain feed, or, for example, could be a milking space 110 where the animals 100 can be milked, or, for example, a sorting space 110 where some animals 100 from a herd can get access to and can be separated from the other animals in the herd. The assembly 10; 12 comprises a measuring device 40, configured to measure a walking speed of the animal 100 and to send a signal Sm indicative of the measured walking speed. Finally, the assembly 10; 12 comprises a control device 50 configured to receive the signal Sm from the measuring device 40, and to control the entrance gate 30, 32 depending on the received signal Sm. An entrance gate 30, 32 comprises a movable part 30, 32 and usually comprises a lateral limitation 20 to channel the animals 100 through the movable part 30, 32. By using the measured walking speed, the control device 50 of the assembly 10; 12 can anticipate when the animal 100 will be at the entrance gate 30, 32 and the control device 50 can control the entrance gate 30, 32 in such a way that the entrance gate 30, 32 is in the desired position as soon as the animal 100 is at the entrance gate 30, 32. The control of the control device 50 could, for example, consist in that, if the animal 100 moves relatively quickly, the entrance gate 30, 32 changes sooner from the first position 32 to a second position 30 or vice versa, to ensure that the entrance gate 30, 32 is in the desired position as soon as the animal 100 is present at the entrance gate 30, 32. The control of the control device 50 could also consist in adjusting the speed at which the entrance gate 30, 32 changes from the first position 32 to the second position 30 or vice versa according to the measured walking speed of the animal 100. In this way, it can be ensured that the reliability of the assembly 10; 12 is improved. An additional advantage of the invention is that, by using the measured speed information of the animal 100, the closing of the entrance gate can be adjusted according to the instantaneous situation, so that the well-being of the animals 100 remains as high as possible. If automatic gate systems are used for animals 100, the gate systems should preferably move as slowly as possible to avoid frightening the animals 100. As the assembly 10; 12 according to the claims makes the control of the entrance gate 30, 32 dependent on the measured walking speed of the animals 100, the speed of the opening and/or closing of the entrance gate 30, 32 can be adjusted so that the reliability of the entrance gate 30, 32 remains very high, while the well-being of the animals 100 is barely disturbed.

The control of the entrance gate 30, 32 depending on the received signal Sm comprises, for example, the increase of a speed of movement of the entrance gate 30, 32 between the first position 30 and the second position 32. This results in an increase in the reliability of the assembly 10; 12, given that the unwanted passage of the animal 100 is prevented. Such a control of the entrance gate 30, 32 also improves the general well-being and health of the animals 100, given that the animal 100 is prevented from being crushed.

In an embodiment of the measuring device 40 according to the invention, the measuring device comprises an optical sensor 42, a mechanical sensor 42 and/or an RF sensor 42. An optical sensor 42 comprises, for example, an infrared sensor 42, a laser sensor 42 and/or a camera 42. An optical sensor 42 of this type could also interact with an identification system 42 based on optical identification tags (not shown) which, for example, emit an optical signal in response to a trigger signal from the optical sensor 42. A mechanical sensor (not shown) comprises, for example, a switch on the ground (not shown) which, for example, measures the successive activation by the forelegs and hind legs. A mechanical sensor could also comprise a type of turnstile (not shown). The RF sensor 42 is, for example, configured to measure signals originating from active RFID tags and/or passive RFID tags.

In the measuring device 40 which comprises an RF sensor 42, the RF sensor 42 is often used to identify the individual animals 100. An RF sensor 42 of this type is furthermore also indicated by the identification sensor 42. These identification sensors 42 are used, for example, together with so-called RFID tags 80 (see FIG. 2A), which comprise both active RFID tags 80 and passive RFID tags 80. A passive RFID tag 80 absorbs a part of the energy from a received radio signal transmitted by the identification sensor 42 and responds to the received radio signal by transmitting its own identification signal 60 (see FIG. 2A) in which, for example, identification information of the relevant animal 100 is encrypted. The passive RFID tag 80 therefore actually reflects the radio signal transmitted by the measuring device 40 and changes the received signal into the 'reflected' identification signal 60 in such a way that it comprises additional information specific to the relevant RFID tag 80. An active RFID tag 80 is triggered by the identification sensor 42 to transmit the identification signal 60. The signal strength of the identification signal 60 of a relevant RFID tag 80 changes with the distance between the measuring device 40 and the RFID tag 80 (see FIG. 3). By then activating the relevant RFID tag 80 in relatively short succession, the change in distance can be determined from the change in signal strength of the identification signal 60 from the RFID tag 80, and consequently the walking speed of the animal 100. This can be done both by activating the passive RFID tag 80 and by triggering the active RFID tag 80. Through an adapted method of reading out the existing identification sensor 42 and through an adapted interpretation of the received/"reflected" identification signal 60 from the RFID tags 80, speed information can be obtained from an existing identification sensor 42 for use in the assembly 10; 12 according to the invention. The adaptation of the method of reading out and interpreting the received identification signal 60 could be incorporated into an existing identification sensor 42 by adding an additional control device (not shown), or by adapting the control software of the identification sensor 42.

In an embodiment of the measuring device 40, the measuring device preferably comprises only one sensor 42 to measure the speed of the animal 100. The advantage of this embodiment is that the assembly 10; 12 is generally quicker and simpler to install, given that only a single sensor 42 needs to be fitted. If the single sensor 42 is a previously installed identification sensor 42 which is adapted in such a way that the speed of the relevant animal 100 can be derived from the identification signal 60, the installation of a new sensor 42 can even be dispensed with or restricted to a software update of the identification system 42.

In an alternative embodiment, the single sensor 42 could, for example, comprise a speed sensor 42 which is fitted in such a way that the walking speed of the animal 100 can be measured at a predetermined distance from the entrance gate. The control device 50 or the measuring device 40 comprise means to convert the measured signal 60 into a value indicative of the walking speed of the animal 100. These means can be implemented as hardware in the control device 50 or the measuring device 40, or can be implemented as software in the control device 50 or the measuring device 40.

In an embodiment of the invention, the measuring device 40 is configured for the more or less continuous measurement of the walking speed of the animal 100. The more or less continuous measurement of the walking speed also comprises the reception of a stream of measurement signals separated by a predefined time window, whereby a stream of speed information is received by the sensor 42 at times discretely separated from one another. An advantage of the more or less continuous measurement of the walking speed of the animal 100 is that sudden speed changes can be detected by the measuring device 40 and the control device 50 can adjust the control of the entrance gate depending on the received speed change. Especially if the assembly 10; 12 is used with livestock, the speed with which an animal 100 moves is relatively unpredictable. Especially if a gate system is used wherein the entrance gate 30, 32 is movable, the animal's experience 100 with the entrance gate 30, 32 may be unpleasant, as a result of which the animal 100, on approaching the entrance gate 30, 32 could suddenly and unpredictably change speed. Through more or less continuous measurement, the control device 50 can anticipate the measured change in the walking speed of the animal 100 and the control device 50 can adjust the control of the entrance gate 30, 32 according to the changed walking speed. The measuring device 40 could also be configured to determine the walking speed of more than one animal 100 more or less simultaneously. In an embodiment of this type, the control device 50 could also use the walking speed differences between the different animals 100 to control the entrance gate 30, 32.

FIG. 1A shows an assembly 10, wherein the entrance gate 30, 32 in the two positions provides or prevents access to a single space. FIG. 1B shows an assembly 12, wherein the entrance gate 30, 32, in the first position 32, provides access to a first space 110 and, in the second position 30, blocks access to the first space 110, but provides access to a second space 112. An assembly 12 of this type is preferably suitable for dividing a herd into two groups, each of which is led into a different space 110, 112.

In an embodiment of the assembly 10; 12, the assembly 10; 12, comprises a stimulator 70 to change the walking speed of the animal 100. The stimulator 70 could, for example, generate a light signal and/or a sound signal to change the walking speed of the animal 100. The stimulator 70 could, for example, also apply an electric shock to the animal 100 to change the speed of the animal 100. The control device 50 is configured, for example, to control the stimulator 70 depending on the measured walking speed of the animal 100, or is configured, for example, to change the difference in the walking speed of two animals 100. As a result, the overall speed of passage can be improved through the assembly 10; 12.

Figure 2A:
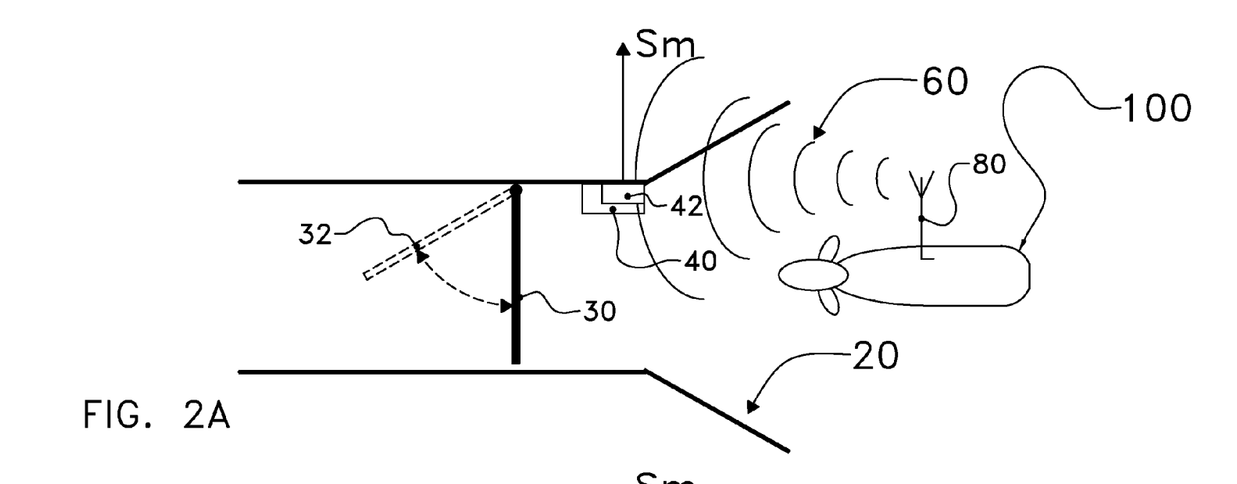
FIGS. 2A and 2B show different sensors which can be used in the measuring device of the assembly according to the invention.
Figure 2B:
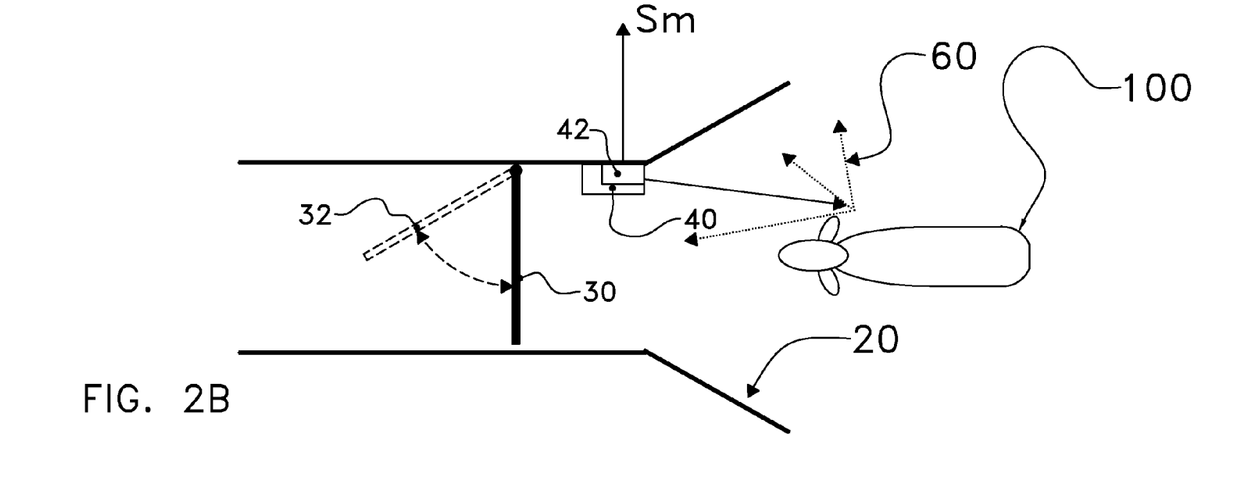

FIGS. 2A and 2B show different sensors 42 which can be used in the measuring device 40 of the assembly 10; 12 according to the invention.

FIG. 2A shows a measuring device which receives a measurement signal 60 from the animal 100. This measurement signal 60 could, for example, be an identification signal 60 transmitted by an active or passive RFID tag 80. By maintaining the transmitted intensity of the identification signal 60 more or less constant, the measuring device 40 can infer from the changing intensity of the measurement signal Sm how quickly the animal 100 is moving and in which direction the animal 100 is moving.

FIG. 2B shows a measuring device 40, wherein the measuring device 40 transmits a signal, for example a light signal, from a laser or a radar signal. As the transmitted signal is partially reflected by the animal 100, a part of the reflected signal 60 can be measured by the measuring device 40. The distance between the animal 100 and the measuring device 40 can then be determined by measuring the time between the transmission of the signal by the measuring device 40 and the reception of the reflected signal 60. By repeating this measurement after a specific time, the speed of the animal 100 can be determined from the measured distance change. An advantage of a system of this type is that no sensors need to be attached to the animal 100 to determine the speed of the animal 100.

Figure 3:
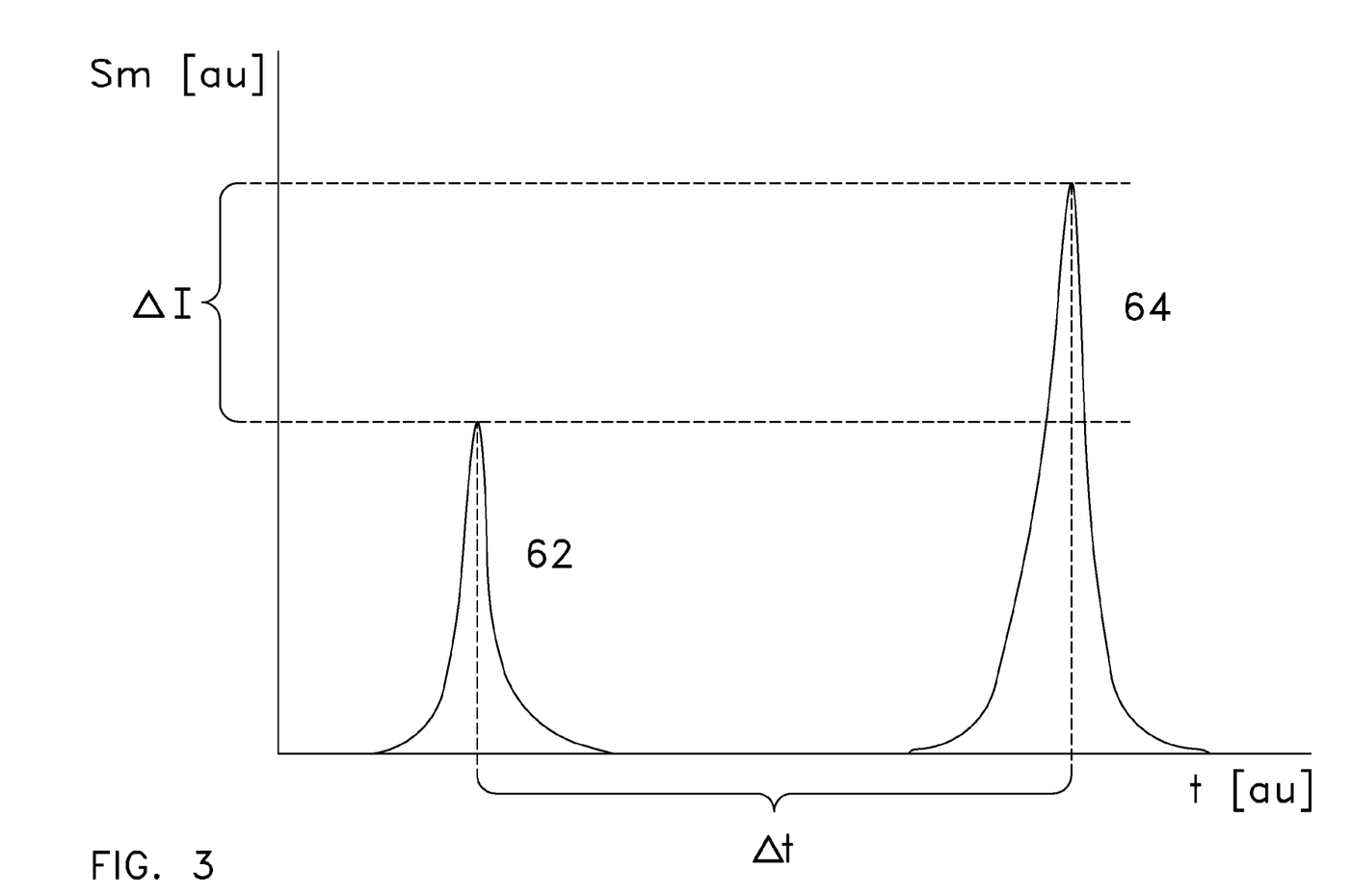
FIG. 3 shows a possible signal received by the measuring device, from which the walking speed of the animal can be determined.

FIG. 3 shows a possible signal Sm; Sm1, Sm2 (see FIG. 4) received by the measuring device 40; 44, (see FIG. 4) from which the walking speed of the animal 100 can be determined. The signal Sm; Sm1, Sm2 which is received by the measuring device 40; 44 comprises two consecutive measurement signals 62, 64 separated by a time window $\Delta t$ measured by the measuring device 40; 44. If the animal 100 moves, the distance between the animal 100 and the measuring device 40; 44 will change. If the animal 100 comes closer to the measuring device 40; 44, the signal strength of the signal Sm; Sm1, Sm2 received by the measuring device 40; 44 will normally increase. If the animal 100 is further removed from the measuring device 40; 44, the signal strength of the signal Sm; Sm1, Sm2 received by the measuring device 40; 44 will decrease. In the embodiment as shown in FIG. 3, the animal 100 moves and the movement of the animal 100 has a component in the direction of the measuring device 40; 44. By comparing the signal strengths of measured signals Sm; Sm1, Sm2 separated by the time window $\Delta t$ with one another, the speed component of the movement of the animal 100 in the direction of the measuring device 40; 44 can be determined. In FIG. 3, the curve with reference number 62 indicates a first measured signal Sm; Sm1, Sm2, and the curve with reference number 64 indicates a second measured signal Sm; Sm1, Sm2. The walking speed can be determined by determining the intensity change $\Delta I$ during the time window $\Delta t$. Calibration of the measuring system 40; 44 appears to be necessary.

Figure 4:
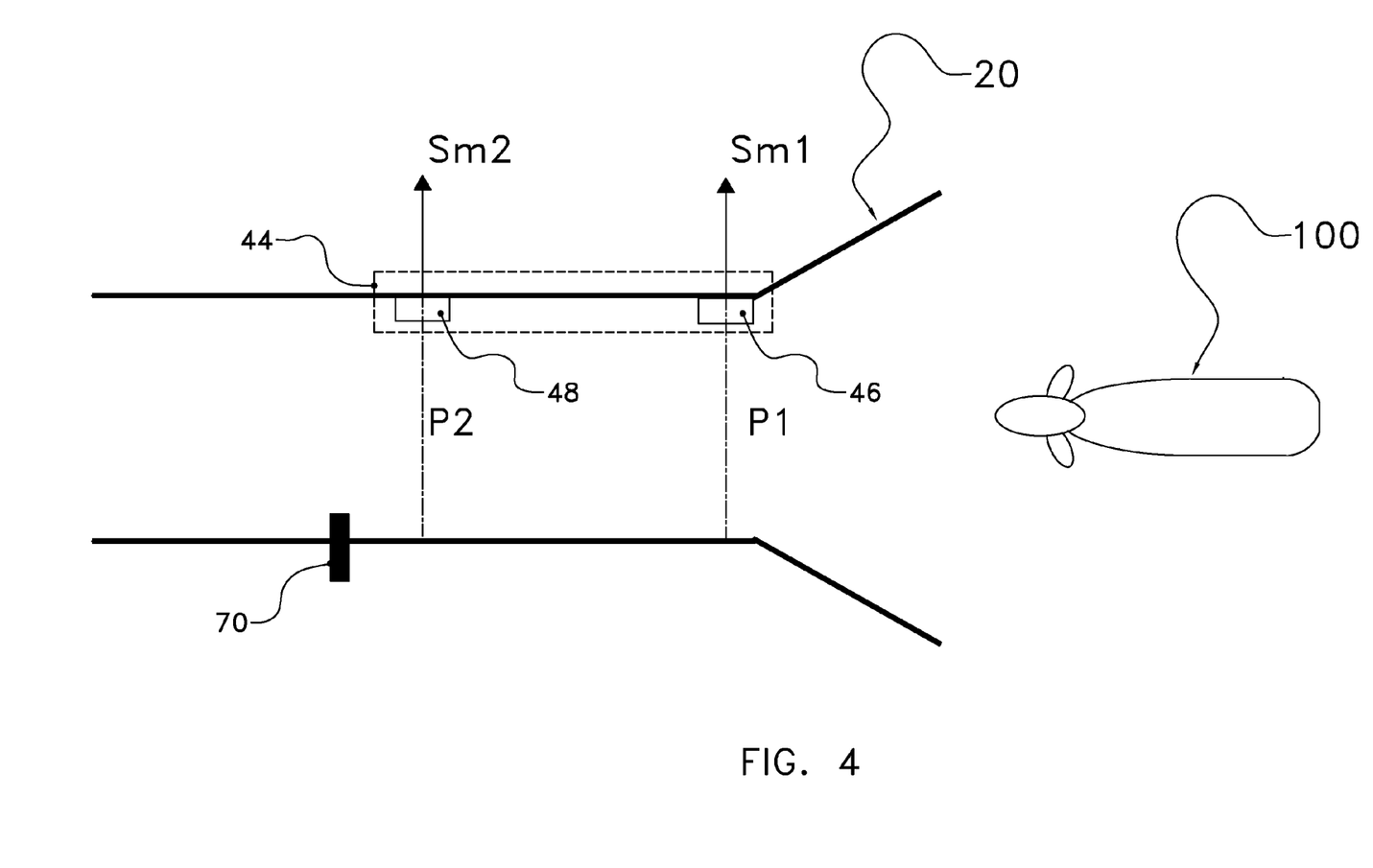
FIG. 4 shows a schematic representation of a measuring device which comprises a first sensor and a second sensor.

FIG. 4 shows a schematic representation of a measuring device 44 which comprises a first sensor 46 and a second sensor 48. The first sensor 46 is configured to measure the presence of the animal 100 at a predefined first position P1, and is configured to transmit a first signal Sm1 indicative of the presence of the animal 100 at the first position P1. The second sensor 48 is configured to measure the presence of the animal 100 at a predefined second position P2 which differs from the first position P1, and is configured to transmit a second signal Sm2 indicative of the presence of the animal 100 at the second position P2. The measuring device 44 and/or the control device 50 is also configured to receive the first signal Sm1 and the second signal Sm2, and to determine the walking speed of the animal 100 based on a time difference between the first signal Sm1 and the second signal Sm2. This embodiment comprises a so-called two-point measurement, from which the walking speed of the animal 100 is determined. Two sensors 46, 48 are positioned at a predefined distance from one another, wherein the time required by the animal 100 to move from the first predefined position P1 to the second predefined position P2 is measured. An average walking speed of the animal 100 between the two measurement points can be determined from this with relative ease. An assembly 10; 12, wherein the speed measurement comprises a two-point measurement, is relatively simple to install, wherein the requirements imposed on the control device 50 to interpret the measurement signals Sm1, Sm2 are relatively low. Thus, despite the fact that two sensors 46, 48 are required, the costs per sensor 46; 48 are usually relatively low, and the costs for the control device 50 which is required to control the entrance gate 30, 32 are also relatively low.

The control device and methods for controlling the assembly 10; 12 according to the invention described above can be implemented in both hardware and software. Especially the method steps as described above can be programmed and executed by a suitable control device such as a suitable microprocessor.

Thus, the invention has been described by reference to certain embodiments discussed above. It will be recognized that these embodiments are susceptible to various modifications and alternative forms well known to those of skill in the art. Modifications may be made to the structures and techniques described herein without departing from the spirit and scope of the invention. Accordingly, although specific embodiments have been described, these are examples only and are not limiting upon the scope of the invention.

What is claimed is:

1. An assembly to provide an animal access to a space, wherein the assembly comprises:
    an entrance gate which, in a first position, provides access to the space and, in a second position, blocks the access to the space,
    a measuring device located in front of the entrance gate, wherein the measuring device measures the walking speed of the animal before the animal enters the entrance gate, and transmits a signal indicative of the measured walking speed to a control device, wherein the measuring device further determines the walking speed of more than one animal approximately simultaneously, and
    the control device configured to receive the signal indicative of the measured walking speed of the animal from the measuring device and to control the entrance gate depending on the received signal based on a speed component of the walking speed of the animal which is in the direction extending to the entrance gate such that the entrance gate is in the desired either first position or second position once the animal arrives at the entrance gate, and
    wherein the entrance gate is further controlled based on walking speed differences in the simultaneously determined speeds of more than one animal.

2. The assembly according to claim 1, wherein the measuring device comprises an identification sensor.

3. The assembly according to claim 1, wherein the measuring device is configured for the approximate continuous measurement of the walking speed of the animal.

4. The assembly according to claim 1, wherein the measuring device comprises at least one of: an optical sensor, a mechanical sensor and an RF sensor.

5. The assembly according to claim 1, wherein the measuring device comprises a first sensor and a second sensor, wherein
the first sensor is configured to measure the presence of the animal at a predefined first position, and is further configured to transmit a first signal indicative of the presence of the animal at the first position, and
the second sensor is configured to measure the presence of the animal at a predefined second position which differs from the first position, and is configured to transmit a second signal indicative of the presence of the animal at the second position,
and
wherein the measuring device is configured:
to receive the first signal and the second signal, and
to determine the walking speed of the animal based on a time difference between the first signal and the second signal.

6. The assembly according to claim 1, wherein the entrance gate is configured to, depending on the walking speed of the animal, adjust a speed of switching between the first position and the second position to prevent the unwanted passage of the animal, or to prevent the animal from being crushed.

7. The assembly according to claim 1, wherein the assembly comprises a stimulator to change the walking speed of the animal.

8. The assembly according to claim 7, wherein the control device is configured to control the stimulator depending on the received signal.

9. The assembly according to claim 7, wherein the stimulator is used to change a difference in the walking speed of two animals.

10. The assembly according to claim 1, wherein the control device is configured to control the entrance gate by either changing the speed at which the gate changes position, or the time at which the gate position is changed.

11. A method of controlling an entrance gate in an assembly to provide an animal access to a space, the method comprising:

providing an entrance gate which, in a first position, provides access to the space and, in a second position, blocks the access to the space;

before the animal enters the entrance gate, measuring a walking speed of the animal using a measuring device, transmitting a signal indicative of the measured walking speed;

receiving the signal indicative of the walking speed from the measuring device; and controlling the entrance gate based on the received signal indicative of the walking speed and on the basis of a speed component of the walking speed of the animal which is in the direction extending to the entrance gate such that the entrance gate is in the desired either first position or second position once the animal arrives the entrance gate;

measuring the walking speed of more than one animal approximately simultaneously; and controlling the entrance gate based on walking speed differences in the simultaneously determined speeds of more than one animal.

12. The method according to claim 11, wherein the step of controlling the entrance gate further comprises increasing a speed of movement of the entrance gate between the first position and the second position in order to prevent the unwanted passage of the animal, or to prevent the animal from being crushed.

13. The method according to claim 11, further comprising activating a stimulator to change the walking speed of the animal.

14. The method according to claim 11, wherein controlling the entrance gate such that the entrance gate is in the desired either first position or second position once the animal arrives the entrance gate is performed by changing the speed at which the gate changes position, or the time at which the gate position is changed.

15. The method according to claim 11, further comprising determining a predicted distance between two animals at the entrance gate, and controlling the entrance gate on the basis of said predicted distance.

* * * * *